United States Patent [19]

Boehm, Jr.

[11] Patent Number: 5,067,734
[45] Date of Patent: Nov. 26, 1991

[54] METAL SEAL WITH GROOVED INLAYS

[75] Inventor: Carl F. Boehm, Jr., Houston, Tex.

[73] Assignee: ABB Vetco Gray Inc., Houston, Tex.

[21] Appl. No.: 531,886

[22] Filed: Jun. 1, 1990

[51] Int. Cl.$^5$ ............................................. F16J 15/08
[52] U.S. Cl. ................................... 277/236; 277/208; 277/215; 166/82; 166/84
[58] Field of Search ............... 277/236, 208, 215, 213, 277/214, 116.2–116.8; 106/82, 84, 86; 285/145, 422, 917

[56] References Cited

U.S. PATENT DOCUMENTS

| | | | |
|---|---|---|---|
| 2,125,231 | 7/1938 | Hurst | 277/236 |
| 2,287,884 | 6/1940 | Jominy . | |
| 3,792,834 | 2/1974 | Billeter | 277/225 |
| 4,470,609 | 9/1984 | Poe | 277/236 |
| 4,665,979 | 5/1987 | Boehm, Jr. | 277/236 |
| 4,749,035 | 6/1988 | Cassity . | |
| 4,751,965 | 6/1988 | Cassity | 277/236 |
| 4,771,832 | 9/1988 | Bridges | 277/236 |
| 4,823,871 | 4/1989 | McEver et al. | 277/236 |
| 4,911,245 | 3/1990 | Adamek et al. . | |
| 4,949,786 | 8/1990 | Ecker et al. | 285/145 |

Primary Examiner—William A. Cuchlinski, Jr.
Assistant Examiner—Daniel G. DePumpo
Attorney, Agent, or Firm—James E. Bradley

[57] ABSTRACT

A metal seal for sealing against casing in a well has a plurality of circumferentially spaced metal bands. An inlay material fills the cavities located between the metal bands. The inlay material has a groove formed in its sealing side. The metal bands are soft enough to deform when the seal if pressed into contact with the casing. The inlay material is softer than the material of the metal bands.

3 Claims, 1 Drawing Sheet

METAL SEAL WITH GROOVED INLAYS

BACKGROUND OF THE INVENTION

1. Field of the Invention

This invention relates in general to casing seals for wellheads, and in particular to a metal seal for sealing between the casing and the wellhead bore.

2. Description of the Prior Art

In a completed oil or gas well, one or more strings of casing will be cemented in the well. A wellhead locates at the surface for supporting the upper end of the casing. In subsea wells, typically a casing hanger will be secured to the upper end of a string of casing.

The casing hanger is an annular member that has an outer surface machined for forming a seal. A casing hanger seal will locate between the casing hanger and the wellhead to seal the annular space surrounding the casing. In many cases, the casing hanger seal will be metal.

Occasionally, difficulties will be encountered in running the string of casing. If the casing cannot extend to the full depth of the well, then it may be impossible to secure a casing hanger to the upper end of the string. When this happens, an emergency seal must be used to seal the annular space between the casing hanger and the wellhead.

Sealing against casing is much more difficult than sealing against a casing hanger. The casing will have a rough exterior. In U.S. Pat. No. 4,911,245, Adamek, et al, Mar. 27, 1990, sealing for a surface wellhead against casing utilizes a member with deformable bands. An inlay of soft material locates in cavities between the bands. While workable, improvements are desirable.

SUMMARY OF THE INVENTION

In this invention, a sealing side of a metal sealing ring seals against the exterior of the casing. The sealing side of the metal ring has protruding annular bands. The cavities between the bands are filled with an inlay material. The bands are of a metal softer than the casing so that they will deform. The inlay material is softer than the bands so that it also deforms. A V-shaped groove is formed in the inlay material. The groove is located on the sealing side of the inlay material. This groove assists in the flow of the inlay material to effect a seal.

DETAILED DESCRIPTION OF THE INVENTION

Figures 1, 2:
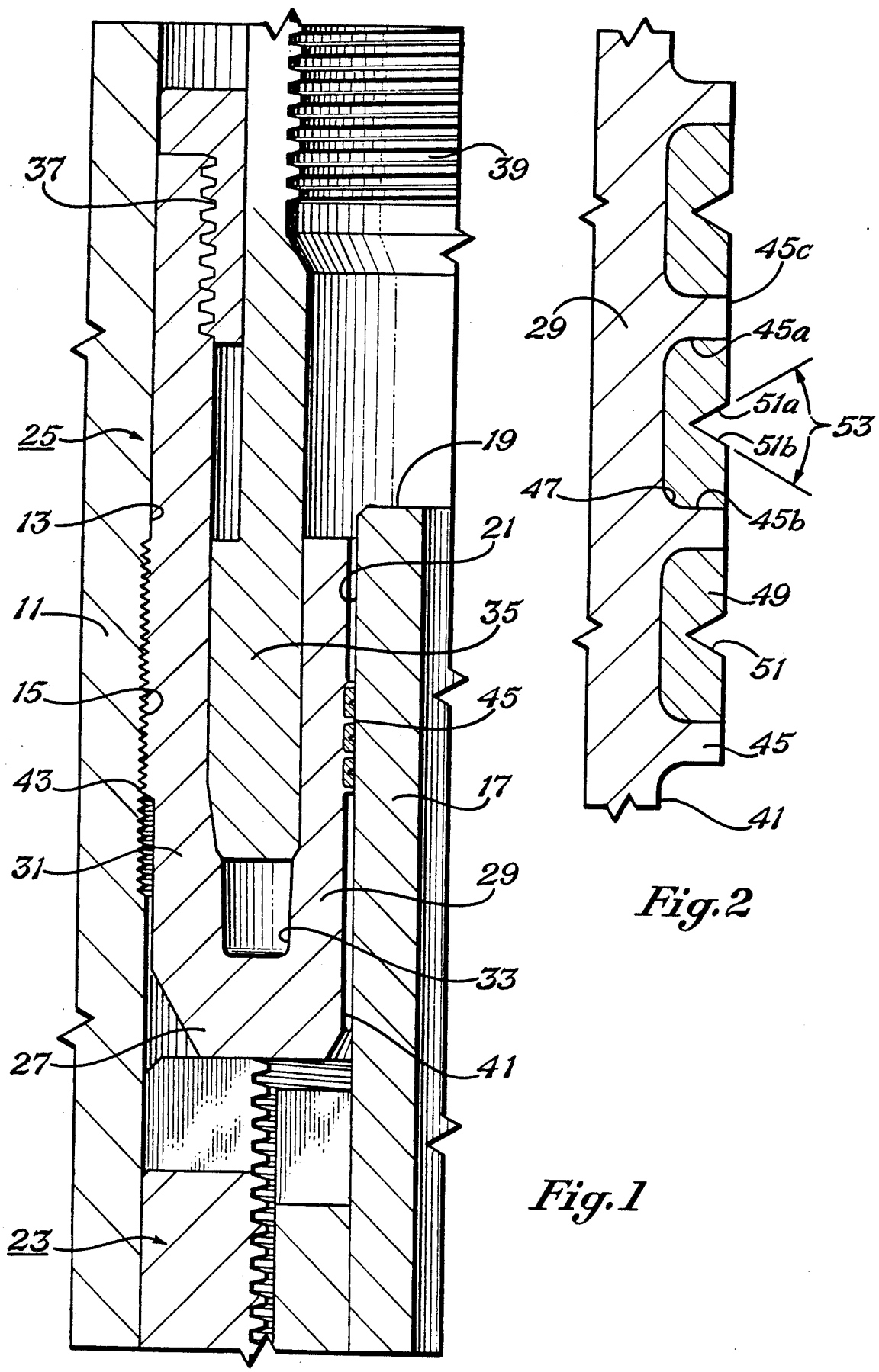
FIG. 1 is a partial vertical sectional view illustrating a seal constructed in accordance with this invention.
FIG. 2 is a partial vertical sectional view, enlarged, of the seal of FIG. 1.

Referring to FIG. 1, wellhead 11 is a large tubular member that in the embodiment shown locates on the subsea floor. Wellhead 11 has an axial bore 13. Preferably a set of wickers 15 will be formed in the bore 13. Wickers 15 are small circumferential grooves, triangular in cross-section.

A string of casing 17 extends into the well. Casing 17 has an upper end 19 that has been cut off at a point within the bore 13 of wellhead 11. Casing 17 has a cylindrical exterior wall 21 that is spaced inward from the bore 13. Supporting slips 23 are shown only partially. Slips 23 support the casing 17 in the wellhead 11. Slips 23 are shown in more detail in U.S. Pat. No. 4,949,786, Lawrence A. Eckert, et al, all of which material is hereby incorporated by reference.

A seal assembly 25 will be lowered into place after the slips 23 have been set and the cementing of the casing 17 has been completed. Seal assembly 25 seals the annular space between the casing 17 and the wellhead 11. Seal assembly 25 has a seal ring 27 of metal. Seal ring 27 has an inner leg 29 and an outer leg 31. The inner leg 29 and the outer leg 31 are radially spaced apart from each other, defining an annular recess 33.

An energizing member 35 will locate in recess 33. Initially, the energizing member 35 will be located in an upper position (not shown). A running tool (not shown) engages threads 39 in the energizing member 35 to move the energizing member 35 from the upper position to the lower position shown. When in the upper position, the upper end of the energizing member 35 will contact a stop member 37. The inner leg 29 has an inner sealing side 41 that is formed to seal against the exterior wall 21 of casing 17. The outer leg 31 has an outer sealing side 43 that is of a material softer than the wellhead 11. This causes the outer sealing side 43 to deform into the wickers 15 for sealing.

In the upper position, the lower end of energizing member 35 will protrude only slightly into the recess 33. In the lower position, shown in FIG. 1, the energizing member 35 extends well into the recess 33. It pushes the legs 29, 31 radially apart from each other. This permanently deforms the legs 29, 31 and causes the outer sealing side 43 to seal against the wickers 15. It causes the inner sealing side 41 to seal against the casing 17.

The inner sealing side 41 has a plurality of circumferential, parallel annular bands 45. As shown in FIG. 2, each band 45 has an upper wall 45a and a lower wall 45b. The upper and lower walls 45a, 45b are radial and perpendicular to the cylindrical sealing side 41 except for a radius formed at the junction between the walls 45a, 45b with the sealing side 41. The bands 45 also have an inner side 45c that is cylindrical and joins the upper wall 45a and the lower wall 45b.

The hardness of the bands 45 is less than the hardness of the casing 17, so that the bands 45 will deform when the seal assembly 25 is energized. Casing 17 would normally have a yield strength of about 55-60,000 PSI. Preferably, the yield strength of the seal ring 27, including the bands 45, will be about one-half the yield strength of the casing 17.

The bands 45 define between them a cavity 47. Cavity 47 is generally rectangular in cross section, but for the curved radius at the junction of each of the walls 45a, 45b with the cylindrical sealing side 41. The cavity 47 is filled with an inlay 49 of soft material. One type of material suitable is an alloy of tin and indium. This material is a lubricant and is much softer than the material of the bands 45. The hardness of the inlay 49 is no more than about 25 percent the hardness of the bands 45.

A groove 51 is formed in each inlay 49. Groove 51 is a circumferential recess located on the sealing side of the inlay 49. Groove 51 is in preferably in a V configuration. It has an upper side 51a and a lower side 51b. The sides 51a, 51b converge to an apex. The included angle 53 between the sides 51a and 51b is preferably about 70 degrees. The axial extent of the groove 51 at its widest point is slightly less than half the axial extent of the cavity 47 from lower wall 45b to upper wall 45a.

In operation, if an emergency occurs such that the casing 17 cannot be lowered to its proper depth, nor safely pulled back to the surface, the operator may cut off the casing 17 to form the end 19. End 19 will locate in the wellhead 11. The operator will support the casing with slips 23. The operator will pump cement down the casing 17 to return up the annulus surrounding the casing 17.

The seal assembly 25 will be lowered into place between the casing wall 21 and the bore 13. A running tool (not shown) will push the energizing member 35 downward. This causes the sealing side 43 of the outer leg 31 to embed in the wickers 15. This also causes the sealing side 41 of the inner leg 29 to move into sealing engagement with casing exterior wall 21. The bands 45 will deform. The inlay 49 will deform also. The grooves 51 assist in the flow of the inlay material 49.

Subsequently, during pressure testing, or due to differential temperatures, the casing 17 may move slightly in axial directions relative to the wellhead 11. When this occurs, a shearing action exists within the inlay 49. The inlay 49 will wipe across the rough exterior of the casing 21 and across the sides 45c of the bands 45. The axial movement of the casing 17 will not destroy the seal.

The invention has significant advantages. The groove in the inlay provides a more effective seal than simply an inlay of material. It assists in the flow of the inlay material in setting and also during shearing action due to movement of the casing relative to the wellhead.

While the invention has been shown in only one of its forms, it should be apparent to those skilled in the art that it is not so limited, but is susceptible to various changes without departing from the scope of the invention.

I claim:

1. In an apparatus having a cylindrical member, an improved means for sealing against the cylindrical member, comprising in combination:

a metal ring having a sealing side facing the cylindrical member;

means for moving the sealing side into sealing contact with the cylindrical member;

a plurality of circumferential axially spaced metal bands protruding radially from the sealing side, defining cavities between the bands, the bands being sufficiently softer than the cylindrical member to deform when forced into contact with the cylindrical member;

an inlay material of metal softer than the bands located in the cavities, the inlay material having a sealing side which is forced into contact with the cylindrical member; and an annular groove formed in the sealing side of the inlay material, the bands causing the material of the inlay to flow toward the groove as the inlay is forced into contact with the cylindrical member, the movement of the material of the inlay as it is forced into contact with the cylindrical member causing a shearing action on the surface of the inlay to enhance sealing.

2. In an apparatus having a cylindrical member, an improved means for sealing against the cylindrical member, comprising in combination:

a metal ring having a sealing side facing the cylindrical member;

means for moving the sealing side into sealing contact with the cylindrical member; and a plurality of circumferential axially spaced metal bands protruding radially from the sealing side, the sealing side of the ring being cylindrical, each of the bands having upper and lower walls perpendicular to the sealing side, defining cavities between the bands which are generally rectangular in cross section, the bands being sufficiently softer than the cylindrical member and having sealing surfaces which deform when forced into contact with the cylindrical member;

an inlay material of metal softer than the bands located in the cavities, the inlay material having a sealing side which is initially flush with the sealing surfaces of the bands prior to being forced into contact with the cylindrical member; and an annular groove formed in the sealing side of the inlay material, the bands causing the material of the inlay to flow toward the groove as the inlay is forced into contact with the cylindrical member, the movement of the material of the inlay as it is forced into contact with the cylindrical member causing a shearing action on the surface of the inlay to enhance sealing.

3. In a well assembly having a wellhead containing a string of casing supported in the bore, an improved means for sealing against the casing, comprising in combination:

a metal ring having an inner sealing side facing the cylindrical member, an outer sealing side facing the wellhead, and a central annular recess;

an annular energizing member carried by the ring and movable from an upper position located above the recess to a lower position in the recess, moving the inner sealing side into sealing contact with the casing and the outer sealing side into sealing contact with the wellhead;

a plurality of circumferential axially spaced metal bands protruding radially from the inner sealing side, the inner sealing side of the ring being cylindrical, each of the bands having upper and lower walls perpendicular to the sealing side, defining cavities between the bands which are generally rectangular in cross section, the bands being sufficiently softer than the cylindrical member and having inner sides which deform when forced into contact with the cylindrical member;

the casing being capable of slight axial movement relative to the ring after the inner sealing side is in sealing contact with the casing;

an inlay material of metal softer than the bands located in the cavities, the inlay material having a sealing side which is initially flush with the inner sides of the bands prior to being forced into contact with the cylindrical member, the inlay material wiping onto the bands during said axial movement; and an annular groove formed in the sealing side of the inlay material, the bands causing the material of the inlay to flow toward the groove as the inlay is forced into contact with the cylindrical member, the movement of the material of the inlay as it is forced into contact with the cylindrical member causing a shearing action on the surface of the inlay to enhance sealing.

* * * * *

UNITED STATES PATENT AND TRADEMARK OFFICE
CERTIFICATE OF CORRECTION

PATENT NO. : 5,067,734
DATED : November 26, 1991
INVENTOR(S) : Carl F. Boehm, Jr.

It is certified that error appears in the above-identified patent and that said Letters Patent is hereby corrected as shown below:

TITLE PAGE:

[56] In the references cited, the inventor of U.S. Patent 4,665,979 is changed from "Bochm, Jr." to --Boehm, Jr.--;

[56] In the list of references cited, the name of the inventor of U.S. Patent 4,949,786 is changed from "Ecker" to --Eckert--;

[57] In the abstract, line 2, "hands" is changed to --bands--;

[57] In the abstract, line 6, "if" is changed to --is--.

Signed and Sealed this

Sixth Day of July, 1993

Attest:

MICHAEL K. KIRK

*Attesting Officer*     *Acting Commissioner of Patents and Trademarks*